(12) United States Patent
Nusser et al.

(10) Patent No.: US 8,996,660 B2
(45) Date of Patent: Mar. 31, 2015

(54) METHOD AND DEVICE FOR THE CONTEXT-DRIVEN INTEGRATION OF CONTEXT-VARIABLE SYSTEMS INTO PROCESS SEQUENCES

(75) Inventors: Willi Nusser, Borchen (DE); Matthias Fuller, Paderborn (DE); Thomas Rustemeyer, Dortmund (DE)

(73) Assignees: Fachhochschule der Wirtschaft, Paderborn (DE); **Eck*Cellent IT GmbH**, Braunschweig (DE)

( * ) Notice: Subject to any disclaimer, the term of this patent is extended or adjusted under 35 U.S.C. 154(b) by 833 days.

(21) Appl. No.: 13/257,010

(22) PCT Filed: Mar. 16, 2010

(86) PCT No.: PCT/EP2010/053350
§ 371 (c)(1),
(2), (4) Date: Nov. 17, 2011

(87) PCT Pub. No.: WO2010/106049
PCT Pub. Date: Sep. 23, 2010

(65) Prior Publication Data
US 2012/0131044 A1    May 24, 2012

(30) Foreign Application Priority Data
Mar. 17, 2009  (DE) .......... 10 2009 013 213

(51) Int. Cl.
*G06F 15/16*  (2006.01)
*G06F 9/445*  (2006.01)
*G06F 17/30*  (2006.01)
*H04L 29/08*  (2006.01)

(52) U.S. Cl.
CPC ............. *G06F 8/60* (2013.01); *G06F 17/3087* (2013.01); *H04L 67/18* (2013.01)

USPC .......................................... 709/219

(58) Field of Classification Search
CPC ................ G06F 17/30861; G06F 17/30864; G06F 17/30867; G06F 17/3087
USPC .......................................... 709/219
See application file for complete search history.

(56) References Cited

U.S. PATENT DOCUMENTS

| | | | |
|---|---|---|---|
| 2003/0191814 A1* | 10/2003 | Tran ............................ | 709/217 |
| 2004/0153373 A1* | 8/2004 | Song et al. .................. | 705/26 |
| 2005/0114493 A1* | 5/2005 | Mandato et al. ............. | 709/223 |
| 2006/0095544 A1* | 5/2006 | Geppert et al. .............. | 709/218 |
| 2008/0033993 A1* | 2/2008 | Uceda-Sosa ................ | 707/104.1 |
| 2009/0234815 A1* | 9/2009 | Boerries et al. ............. | 707/3 |
| 2010/0005531 A1* | 1/2010 | Largman et al. ............. | 726/24 |
| 2010/0191807 A1* | 7/2010 | Brown et al. ................ | 709/204 |

FOREIGN PATENT DOCUMENTS

| | | |
|---|---|---|
| EP | 1217857 A2 | 6/2002 |
| EP | 1641229 A1 | 3/2006 |

OTHER PUBLICATIONS

German Examination Report for DE 102009013213.9 (Oct. 23, 2009).
European Examination Report for EP 10715514.5 (Apr. 12, 2013).
Y. Yamato et al., "Study and Evaluation of Context-Aware Service Composition and Change-Over Using BPEL Engine and Semantic Web Techniques", CNCC 2008, 5th IEEE Consumer Communications and Networking Conference (2008) pp. 863-867.
G. Chen et al., "A Survey of Context-Aware Mobile Computing Research", Internet Citation, XP-002227105 (Nov. 30, 2000) pp. 1-16.
Declaration of Non-Establishment of International Search Report of PCT/EP2010/053350 (Aug. 6, 2010).
Y. Yamato et al., "Study and Evaluation of Context-Aware Service Composition and Change-Over Using BPEL Engine and Semantic Web Techniques", CNCC 2008, 5th IEEE Consumer Communications and Networking Conference (2008) pp. 863-867.
International Preliminary Report on Patentability of PCT/EP2010/053350 (Sep. 20, 2011).

* cited by examiner

*Primary Examiner* — Jeong S Park
(74) *Attorney, Agent, or Firm* — Millen, White, Zelano & Branigan, P.C.

(57) ABSTRACT

Method for the context-driven integration of context-variable systems (CVSs), in particular but not exclusively in the form of mobile systems (MSs), into processes, which system can collect sensor data, comprising an infrastructure system which is connected to the MS via a network, wherein the infrastructure system comprises a central enrichment service (CES) and process retrieval service (PRS), there also being provided a central process engine (CPE) on which the sequence of the processes is controlled, a management unit (MU) functioning as a proxy between the CPS and MU, including the steps:

a) booting up the MS and determining the initial context, i.e. context information which is directly accessible to the system;
b) transmitting the (initial) context to the CES via the network and enriching the context there;
c) selecting the appropriate process for the MS based on the context information with the aid of the PRS, and filing the context information in the process;
d) transferring the context information to the MS via the MU, so that the MU can determine the MS based on the context information;
e) carrying-out of the process by the CPE which sends queries to the MS only via the MU, the queries comprising the context information, so that the MU dynamically forwards an allocation of the query to an MS based on the context information;
f) returning the responses from the MS to the processes on the CPE via the MU.

20 Claims, 4 Drawing Sheets

Fig. 1

| ID | Context ItemTyp | Value | Range Reference | Item Reference |
|---|---|---|---|---|

METHOD AND DEVICE FOR THE CONTEXT-DRIVEN INTEGRATION OF CONTEXT-VARIABLE SYSTEMS INTO PROCESS SEQUENCES

The invention relates to a method for the context-dependent integration of context-variable systems into new or existing method sequences/steps. The term "context-variable" is in this case used to designate systems, such as for example mobile systems, the behaviours of which are influenced to a particular degree by a varying environment. This method is implemented and supported by industrial systems.

FIELD OF THE INVENTION

Context-variable systems are an increasingly widespread type of computing systems. Mobile systems, such as mobile phones or vehicles, are an important example of this type. Other examples would include stationary computers which are tightly coupled to the environment via sensors. Three particular properties of this system type will be revealed hereinafter based on the example of mobile systems. Firstly, mobile systems have become more and more powerful in recent years, so that nowadays even mobile phones are equipped with computing capacities allowing use in operational processes, for example, that goes beyond a simple display functionality (see EP 000001641229 A1, EP 000001628199 A2, EP 000001447758 A3) or isolated applications (EP 000001217857 A3). Other related inventions are disclosed in US 2004/0153373 A1 or in Yamato Y., Nakano Y., Sunaga H.: "Study and Evaluation of Context-Aware Service Composition and Change-Over Using BPEL Engine and Semantic Web Techniques" in CNCC 2008, 5th IEEE Consumber Communications and Networking Conference, 2008 p 863-867. However, in current systems, this simple form of use is the main form.

The capability, which is nowadays taken as read, of mobile systems to communicate via networks allows mobile systems to be integrated more effectively into sequences/process flows.

The third and crucial special feature of this system type is based on the fact that its behaviour is influenced to a much greater degree by an alternating environment. This also means that the sequences/steps which are beneficial or desired at a given point in time are markedly dependent on the current context of the mobile system. The current context determines the process in which the mobile system is active, for example, and the permitted actions of the mobile system. Thus, for example, the process in which an agricultural engine is to be integrated differs depending on the fuel level of the engine: at a low fuel level, the refuelling process must be started and this may require other processes, such as harvesting processes, to be interrupted. This example in itself shows that a comprehensive integration of mobile systems into processes requires more than just location information. The entire context of the mobile system—generally the context-variable system—is important (see A. Dey and G. D. Abowd, Towards a Better Understanding of Context and Context Awareness, College of Computing, Georgia Institute of Technology, 1999). A flexible and communicable detection and modelling of the context is thus particularly important (see T. Strang and C. A. Linnhoff-Popien, Context Modeling Survey, Workshop on Advanced Context Modeling, Reasoning and Management, UbiComp, 2004). Nowadays, a large number of the above-described systems have corresponding sensors which can provide context information ranging from location coordinates to engine states. Nevertheless, certain information is, for example, not accessible to the mobile systems themselves, but has to be added to the context by external systems. Examples of this include personal preferences and user profiles, such as preferences for restaurants, which are generally not held on a mobile system such as the mobile phone.

To date, standard processes have made little use of these particular properties and the resources associated therewith of context-variable, especially mobile systems. Two routes/target courses for increased use of context-variable systems in processes are conceivable in this regard. On the one hand, novel standard processes can result from the use of resources of this type. This also includes simple extensions of existing processes, such as for example a weather-dependent selection of neighbouring restaurants, as well as entirely novel application models, for example in the areas of tourism or agriculture.

The second route addresses the optimisation of existing processes by an improved integration of context-variable systems. A good example of this is agricultural production in which many processes are subject to a comprehensive duty of documentation. The majority of these processes, such as for example harvesting, currently involve mobile appliances, although the data from these appliances are still in most cases collated manually. However, the ever-rising volume of data means that this procedure is now hardly practicable. A complete and automated integration of context-variable and especially mobile systems into business sequences is needed.

OVERVIEW OF THE INVENTION

The object of the invention is to describe a novel method allowing the context-driven and automated integration of context-variable systems into standard processes. In this case, this method conceptually replaces the previously valid paradigm of passive context (context awareness of applications) with the active role of context as the driver of changes in standard processes.

The invention also seeks to propose an architecture of an industrial system for achieving the first aim. This architecture contains components on sides of the context-variable systems and the central systems (server). Implementation details, for example specific forms of the use of ontologies for modelling context that lead to an operative architecture, are also described.

This gives rise to the following partial objects which are achieved by industrial systems and are thus automated:
a) Design and implementation of a flexible modelling, distribution and processing of context information.
b) Identification of appropriate standard processes with the aid of the context information.
c) Design and implementation of life cycle management of the standard processes, thus allowing the integration of context-variable systems.
d) Integration of context-variable systems into selected standard processes, so that business sequences can subsequently proceed without human interaction.

These objects are achieved by an invention having the features of the independent claims.

Figure 1:
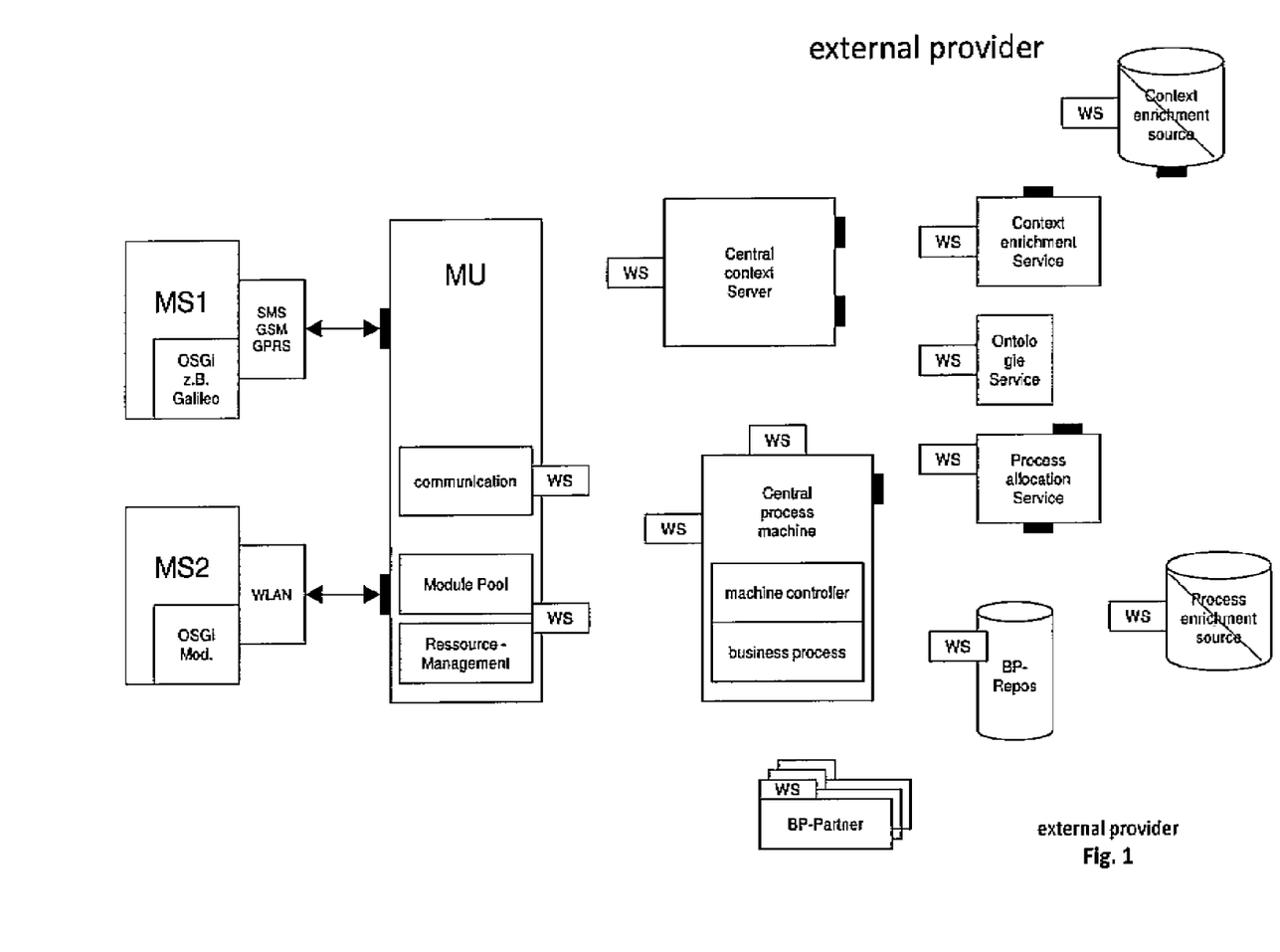
FIG. 1 shows the architecture of the infrastructure for the context-driven and automated integration of context-variable systems into standard processes.

The design-related and technical realisation of these aspects will be described hereinafter. This will involve firstly presenting structural and technical elements which are necessary for working with context, standard processes and context-variable systems. The method itself will subsequently be presented. The basis of this is the architecture of the invention sketched in FIG. 1. This architecture is the technical infrastructure for carrying out the method of the invention.

The modelling of context information has been discussed in the literature for approx. 15 years. This discussion has for example also described the distinguishing of the context information into physical and logical information (see T. Gu, H. K. Pung and D. Q. Zhang, A service-oriented middleware for building context-aware services, J. Netw. Comput. Appl., Academic Press Ltd., 2005, 28, 1-18). Physical context information is determined directly by sensors of the context-variable system. Logical context information is inferred from the physical context information. A good example is the differentiation of the physical location and the logical vicinity ("close to") of this location in mobile systems. Generally, logical context information is not inferable from the mobile system itself, but requires external services, for example a map or GIS service.

The present method uses this distinction, but extended by an important aspect: if physical context information is provided with a range indication indicating which changes still lead a same logical context, then this can be used for a type of context caching: not every change to the physical context then leads to a change to the logical context. The example of location shows this very clearly: if the location changes by a few meters, a person is, for example, still "in the vicinity" of a certain building.

BRIEF DESCRIPTION OF THE FIGURES

The figures of a possible embodiment will briefly be described hereinafter, although without thereby entailing any limitation. In the drawings.

DESCRIPTION OF A POSSIBLE EMBODIMENT

Figure 2:
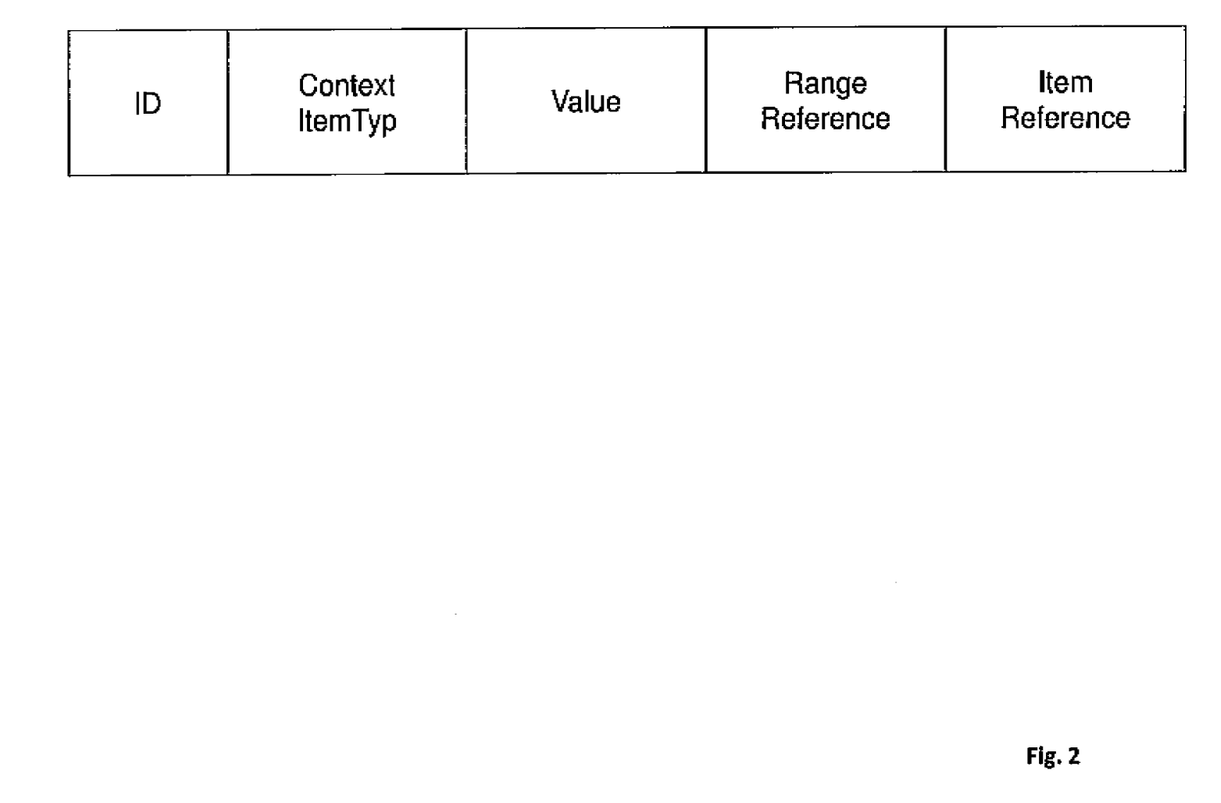
FIG. 2 shows the construction of a context item.

The invention also uses its own approach for the basic modelling of the context. In order to obtain a flexible and at the same time universal usable description of the very different types of context information, the possible types (such as location, time, filling level of the fuel tank, temperature of the transmission, personal preferences of a user, etc.) are defined within an ontology. The context itself is modelled as a graph of context items. Each context item has the structure shown in FIG. 2. The ID serves to uniquely identify the item. The context item type notes the ontology value representing the type of the context information described in the present document, for example physical location, fuel level, restaurant preferences. The specific values, such as degrees of length and width, are in the Values field. In the case of physical context information, the following field contains range reference indications as to when a value change leads to a new item of logical context information. Finally, the term "References" in FIG. 2 embraces certain further fields allowing, for example, the underlying physical context items to be concluded from logical context information. This allows relationships in the ontology, such as for example the relations "is derived from" or "pertains to", to be represented.

In this way, the full context of a context-variable system forms a graph, the elements of which are tagged by an ontology (ontology tagged context graph). This novel approach offers high flexibility and at the same time interoperability.

Figure 3:
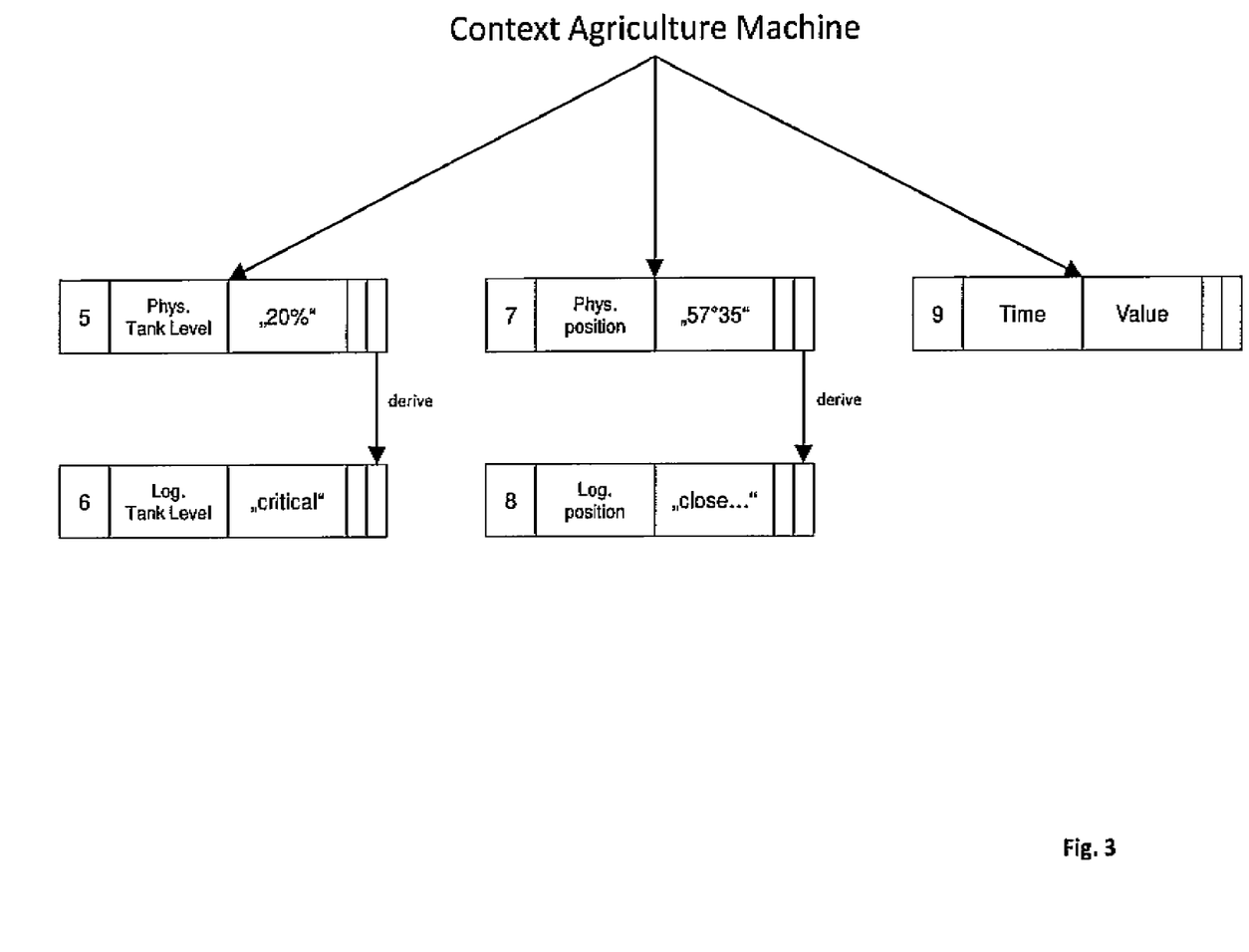
FIG. 3 is an illustration of a simplified context of an agricultural engine.

FIG. 3 shows an example of a greatly simplified context of an agricultural engine at a specific point in time.

A further innovation of the context system is key and relates to the basic role of the context. All previous approaches understand the context as a passive component which can be inferred from applications. These applications are described as being context-aware (see also T. Hofer, W. Schwinger, M. Pichler, G. Leonhartsberger, J. Altmann and W. Retschitzegger, Context-awareness on mobile devices—the hydrogen approach, Proceedings of the 36th Annual Hawaii International Conference on System Sciences, 2003, 292-301). However, in the present method, the context acts—by means of the infrastructure which functions as a mediator—actively: changes in the context of a mobile system, for example, lead to changes in the ongoing processes in which the mobile system participates, without these processes having to contribute thereto. The present method therefore inverts the previous relationship of dependency and may thus be described as context-driven.

In work with standard processes, BPEL has become established as the standard for describing and carrying out standard processes (http://docs.oasis-open.org/wsbpel/2.0/wsbpel-v2.0.pdf). BPEL is only an example, with well known limitations. Within the present method, two aspects of this specification must be emphasised in particular. On the one hand, a distinction must be drawn between a standard process model and a running instance of this model. The standard process model is described in BPEL and describes, for example, the process of refuelling any desired agricultural engine. The instance is a specific embodiment of the model and regulates the refuelling of a specific engine belonging to Farmer F. The "refuelling" process can be carried out by a plurality of different engines at a given point in time. Each engine communicates in this process with the instance which is associated therewith and tagged by an instance ID (IID).

In BPEL terminology, from the viewpoint of the instance, all external systems addressed in the course of the process are to be understood as process partners. However, in the present scenario, it is necessary to distinguish in this regard—and this is the second aspect—more precisely between partners known at the design time of the process model and partners which must first be dynamically detected and integrated. These also include context-variable systems.

In the present method, these aspects are supplemented by further innovation. Firstly, standard process descriptions themselves are to be kept largely independent of specific context values. Standard processes are thus to be implemented—in keeping with the context-driven approach—as being context-agnostic: they may not themselves enquire about specific context values. This design decision is essential in order to be able to easily use for example pre-existing BPEL descriptions even in scenarios involving mobile systems, for example.

Secondly, the BPEL descriptions must be provided with elements of the context ontology, so that an association between the context information and BPEL descriptions can be produced. This can take place using a table, for example, in which the relevant context item types are recorded for particular BPEL descriptions. Thus, for example, the "logical fuel level", "location", etc. context item types are, inter alia, relevant to the "refuelling" process, for example. For the "restaurant reservation" process, the relevant context item types would include "location", "time", "weather" and "personal restaurant preferences".

Finally, for a context-variable system, currently relevant standard processes are also to be regarded as part of the context of this system. The context is therefore enriched with specific context item types describing the standard processes which are possible at any given moment. This extension is sketched in FIG. 4.

In the particular case of mobile systems, the management of the context-variable systems themselves is to be considered separately, as in mobile systems availability and adequate software facilities cannot always be a priori ensured, for example. Mobile systems are therefore managed primarily by means of the management unit (MU). The management unit manages the mobile systems and is the generic contact (proxy) for the communication arising in the course of the carrying-out of the standard processes. The standard process instances address only the MU. The MU itself performs the forwarding of the messages to the correct mobile systems. For this purpose, it maintains/stores/mangages the relevant context information of the mobile systems and the BP instances. With the aid of this information, the MU can process the queries of the standard process in a context-dependent manner and forward them to the corresponding mobile system. The communication between the mobile system and MU can in this case take place in different ways and is not limited to Web Service calls. For this purpose—and this is a further essential part of the present infrastructure—the MU transforms queries from standard processes on mobile systems into a generic query which in a further step is then mapped onto the appropriate forms for the mobile system. The properties of the mobile system determine the appropriate form in this regard. Thus, for small mobile systems such as mobile phones, it may be a communication by means of specific, possibly binary protocols via SMS or GPRS. In other systems, it may be XML-based network protocols via more rapid connections such as UMTS, etc.

The MU operates in a similar manner also in communications from the mobile system toward the standard process. Communication queries from the mobile system are converted in accordance with the above-described mode of operation and forwarded to the respective standard process instance.

In addition, the described transformation of the queries allows the query to be stored. If the mobile system is unavailable, the query can then be sent to the system at a later point in time or be answered from already provided data if the data are sufficiently up-to-date. In this way, it is also possible to combine queries so as to minimise communication.

The MU can also communicate with further MUs of other systems in order in this way to seamlessly integrate other companies' mobile systems. The MU thus functions as a proxy to further MUs, thus allowing company-spanning standard processes. This also involves exchanging context information; the standard processes do not distinguish between their own and extraneous mobile systems. In this way, even the installation of software components on extraneous mobile systems for implementing functions required for the standard processes, as described in the next paragraph, is in principle possible.

However, the management unit can perform still further tasks within the infrastructure. Thus, the management unit can provide a repository for modules for establishing context, sensor communication and other extensions which can be used by the mobile systems. In addition, this necessitates on the mobile systems a local infrastructure allowing the dynamic reloading of modules required, for example, for processing further sensor data. The OSGi platform offers one possibility in this regard (http://www.osgi.org).

Figure 4:
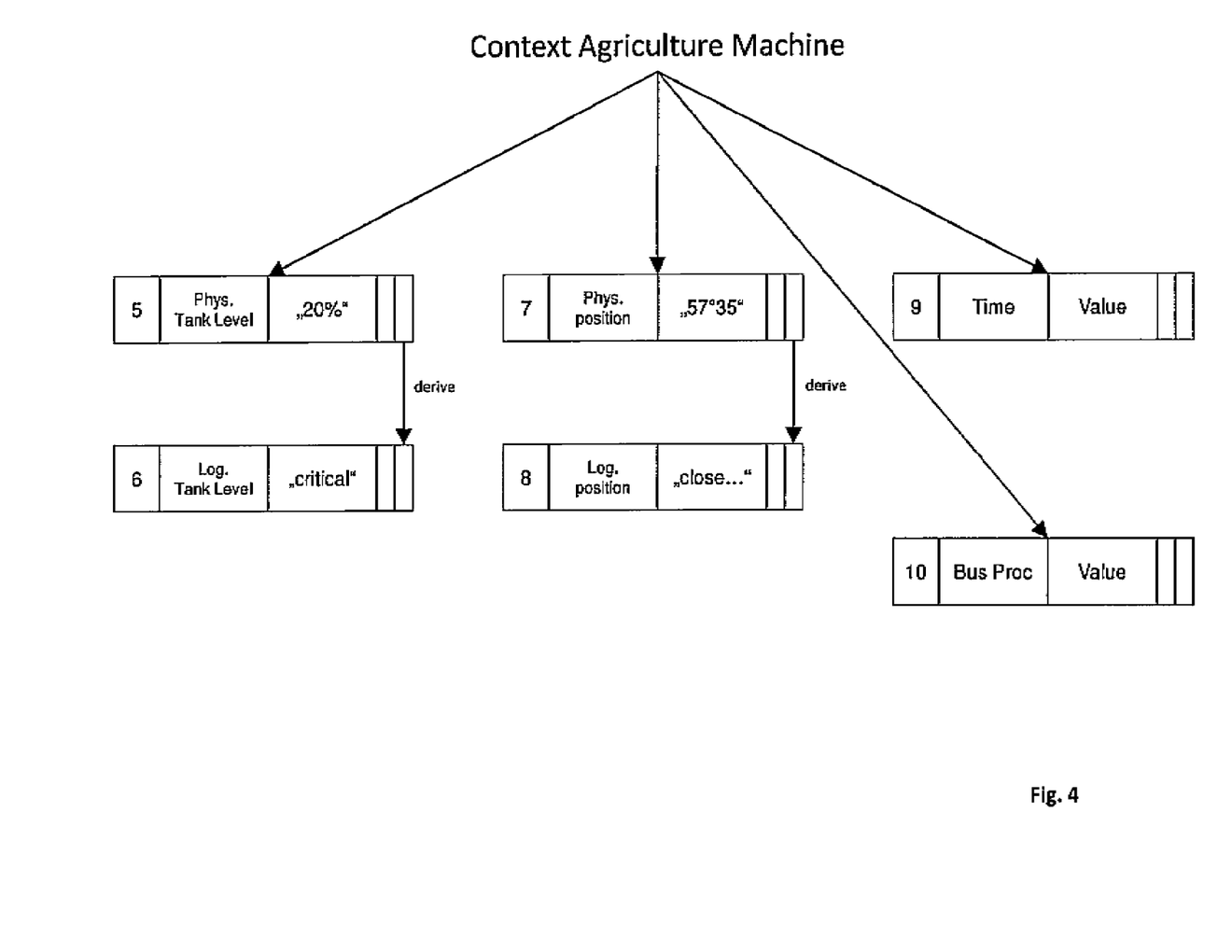
FIG. 4 is an illustration of an extended context.

On the basis of the described principles, the method proceeds in the most complex case, i.e. the context-driven integration of mobile systems into standard processes, as follows:

1 The mobile system (MS) boots up and determines the initial context, i.e. context information directly accessible to the system, such as for example location, time, values of engine sensors such as the filling level of tanks. FIG. 3 shows in the three upper rectangles elements of a possible initial context.
2 This initial context is transferred to the infrastructure, specifically the central context server (CCS).
3 In the infrastructure, the following takes place:
3.1 The central enrichment service (CES) enriches the context. Examples include the evaluation of the state of the engine by way of the engine manufacturer's technical logic, info about nearby objects. FIG. 3 shows an extended context of this type.
3.2 The process retrieval service (PRS) looks for appropriate standard processes (the term "appropriate" means appropriate according to ontology entries and values of the incoming context and the allocation of the context item types to standard processes) and enters these into the context. This is illustrated in FIG. 4.
3.3 If appropriate, context indications, which are necessary for finally determining a GP, are also entered into the context. Thus, it is conceivable that information from further sensors is necessary to fully describe the state of an engine.
4 The context returns—via the MU—to the MS.
5 If appropriate, sensor modules necessary to meet the requirements from 3.3 above are installed on the MS.
5.1 A renewed cycle of the infrastructure commences with this extended context, see point 3. Finally, appropriate standard processes—if provided—are determined.
5.2 Appropriate GPs are noted into the context by means of their context item types.
6 Selection—manual or automated—of an appropriate GP. This information is also contained in the MU.
7 Start of the selected GP in the central process engine (CPE) by the engine controller.
8 The first call by the engine controller provides the instance ID (IID) of the started GP instance. This ID is also noted in the context of the MS.
9 The further communication between the GP instance and MS takes place only via the MU. Based on the stored context information from the MS, the MU can forward the query to the corresponding MS. The appropriate business partners of the GP instance are thus dynamically replaced by the mobile system or systems.
10 Result: The MS runs in the GP. However, at the same time, sensors continue to operate and provide changes to the physical context.
11 if change of the physical context exceeds the indicated limit (see range), a new logical context must be determined. For example: in the case of a tourist, changes of location by more than 2 km can lead to completely new potential restaurants or tourist attractions, whereas movements of 50 m in this scenario have no influence.
12 The new context is sent into the infrastructure, see point 3. If appropriate, new/other GPs are recognised as relevant and entered into context.
13 If appropriate, select the new GP based on this extended context, see point 6.
14 If either the current or the new process uses the mobile system exclusively, the state of the current process must be stored and the current process must be interrupted. This takes place in the CPE.
15 The newly selected GP is started and allocated to the MS, as in points 7, 8 and 9.
16 And so on as in point 11—if appropriate ad infinitum.

In summary, this provides a method for the context-driven selection and integration of context-variable systems (CVSs)

into processes that is based on an ontology tagging of context information and process descriptions. The method includes context retrieval, context enrichment, the allocation of the context of a context-variable system by means of ontology-based tags to likewise tagged processes, and process management.

The invention claimed is:

1. Method for the context-driven integration of network-capable, digital context-variable systems (CVSs) the behaviors of which are influenced to a particular degree by a varying environment into digital processes, with a context-variable system (CVS) and an infrastructure system, wherein the infrastructure system comprises a central enrichment service (CES) and a process retrieval service (PRS), there also being provided a central process engine (CPE) on which the sequence of the processes is controlled, the method including the steps:
   a) transmitting of context information to the infrastructure system over the network, wherein types of context information are defined within an ontology, and a context being modeled as a graph of context items, elements of which are tagged by the ontology;
   b) enriching the context information in the CES;
   c) selecting the appropriate process for the CVS based on the context information with the aid of the PRS, and filing the process information in the context and entering appropriate process context indications for information of further sensor modules;
   d) transferring the context information to the CVS over the network, so that the CVS can identify the process;
   e) if the context indications of step c) request sensor information, then the sensor modules are downloaded or installed on the CVS;
   f) carrying-out of the process by the CPE which sends queries to the CVS, wherein the queries do not have to contain any context information; and
   g) returning the responses from the CVS to the processes on the CPE over the network.

2. The method according to claim 1, characterized by context-sensitive communication with CVS by means of a management unit (MU) which performs the entire communication between the CVS and the infrastructure system, including managing context information on the CVS, dynamically determining the appropriate target MS and forwarding queries thereto, transmitting messages from the MS to the CPE.

3. The method according to claim 1, including repeating steps b), c), d), e), f) and g) if the changes to the physical context on the CVS that were transferred in step d) through the context exceed an indicated limit.

4. The method according to claim 1, wherein if a CVS can work only exclusively in one process without other processes, then the CPE interrupts other processes which are possible for the CVS and stores their state.

5. The method according to claim 1, wherein the central enrichment service (CES) enriches the context by the technical logic of the CVS manufacturer.

6. The method according to claim 1, wherein the process retrieval service (PRS) selects appropriate processes in accordance with ontology entries and/or values of the incoming context and/or the allocation of the context item types to standard processes, and enters these into the context.

7. The method according to claim 1, wherein still further context indications, which are necessary for ultimately determining a standard process, are entered into the context, this causing the CVS which obtained the context in step d) to install sensor modules and the context to be retransferred in order to carry out steps a-g) again.

8. The method according to claim 7, wherein from a central repository in the network the sensor modules are downloaded to the CVS in order to install them.

9. The method according to claim 1, wherein the process descriptions are provided with meta information such as elements of the context ontology, so that an allocation between context information and process descriptions can be produced.

10. The method according to claim 1, wherein physical context information is provided with a range indication indicating which changes still lead to a similar logical context, so that this can be used for a type of context caching in order to minimize the number of queries from the CVS to the infrastructure.

11. Device for the context-driven integration of network-capable, context-variable systems (CVSs), the behaviors of which are influenced to a particular degree by a varying environment, into processes, which system can collect sensor data, comprising an context-variable systems and a infrastructure system, wherein the infrastructure system comprises a central enrichment service (CES) and process retrieval service (PRS), there also being provided a central process engine (CPE) on which the sequence of the processes is controlled, with the following components:
   a) booting up device, to boot up the CVS and determining an initial context information, wherein initial context information are directly accessible to the system;
   b) transmitting device, for transmitting the initial context information of the CVS to the CES and enriching the context there over the network, wherein types of context information are defined within an ontology, the context being modeled as a graph of context items, elements of which are tagged by the ontology;
   c) selection device, selecting the appropriate process for the CVS based on the initial context information with the aid of the PRS, and filing the process information in the initial context information and entering appropriate process context indications for information of further sensor modules;
   d) transferring device, for transferring the context information to the CVS, so that the CVS can identify the process and download or install sensor modules on the CVS if the context indications request sensor information;
   e) processing unit for the carrying-out of the process by the CPE which sends queries to the CVS, wherein the queries do not have to contain any context information;
   f) returning device to return the responses from the CVS to the processes on the CPE over the network.

12. The device according to claim 11, comprising means allowing context-sensitive communication with CVS by means of a management unit (MU) which performs the entire communication between the CVS and the infrastructure system, including managing context information on the MU, dynamically determining the appropriate target CVS and forwarding queries thereto, transmitting messages from the CVS to the CPE.

13. The device according to claim 11, comprising means, wherein the means b), c), d), e), f) are used again if the changes to the physical context on the CVS that were transferred by the means d) through the context exceed an indicated limit/range.

14. The device according to claim 11, wherein if an exclusive use of a CVS is necessary in one process, then means are used in such a way that the CPE interrupts other processes which are possible for the CVS and stores their state.

15. The device according to claim 11, wherein means are provided, so that the central enrichment service (CES) enriches the context by the technical logic of the CVS manufacturer.

16. The device according to claim 11, wherein means are provided, so that the process retrieval service (PRS) selects appropriate processes in accordance with ontology entries and/or values of the incoming context and/or the allocation of the context item types to standard processes, and enters these into the context.

17. The device according to claim 11, wherein means are provided for entering still further context indications, which are necessary for ultimately determining a standard process, into the context, this causing the CVS which obtained the context in step d) to install sensor modules and the context to be retransferred in order to carry out steps a-f again.

18. The device according to the claim 17, wherein means are provided for a central repository in the network to download the sensor modules by the CVS in order to install them.

19. The device according to claim 11, wherein the process descriptions are provided with meta information such as elements of the context ontology, so that an allocation between context information and process descriptions can be produced.

20. The device according to claim 11, wherein physical context information is provided with a range indication indicating which changes still lead to a similar logical context, so that this can be used for a type of context caching in order to minimize the number of queries from the CVS to the infrastructure.

* * * * *